UNITED STATES PATENT OFFICE.

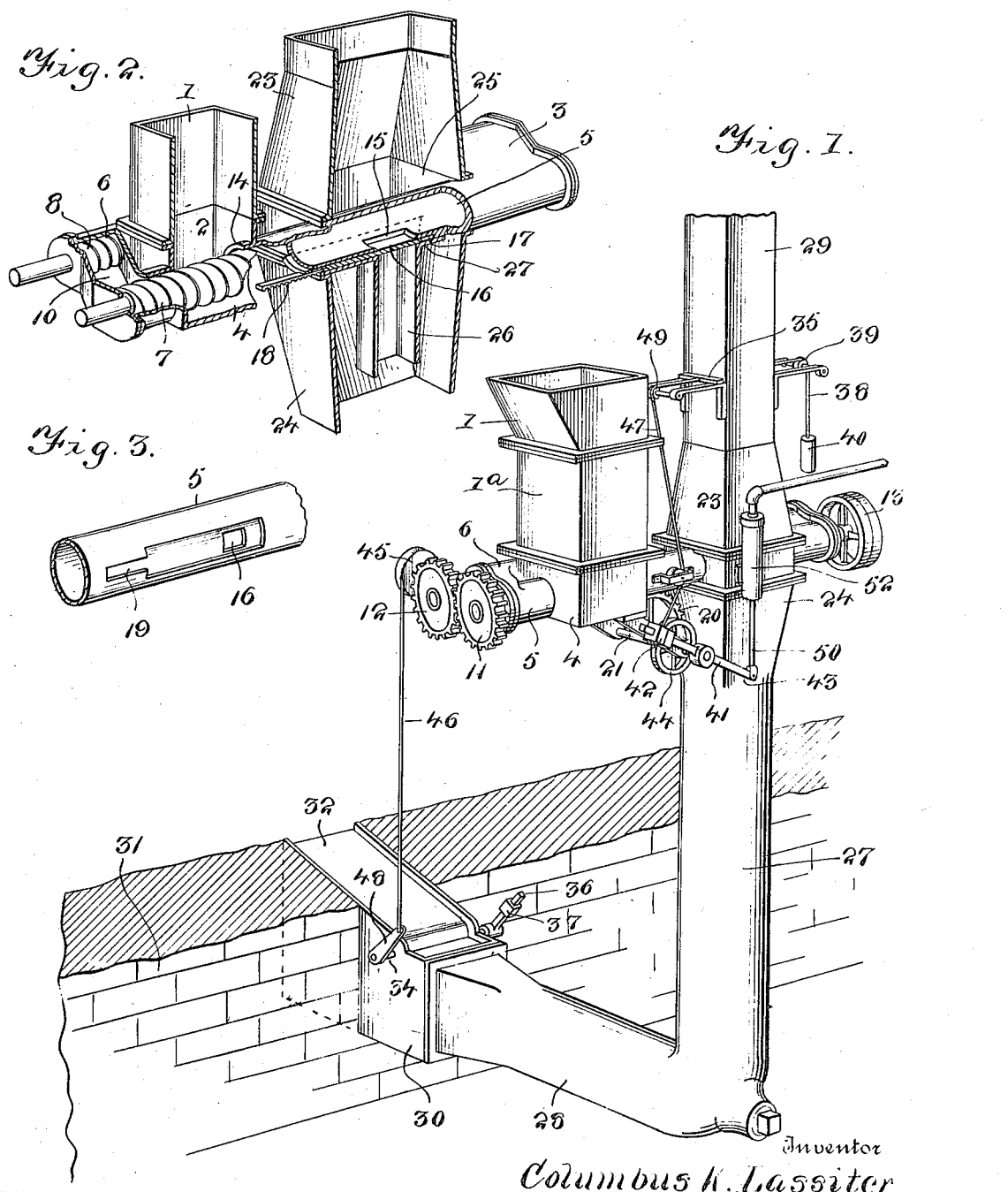

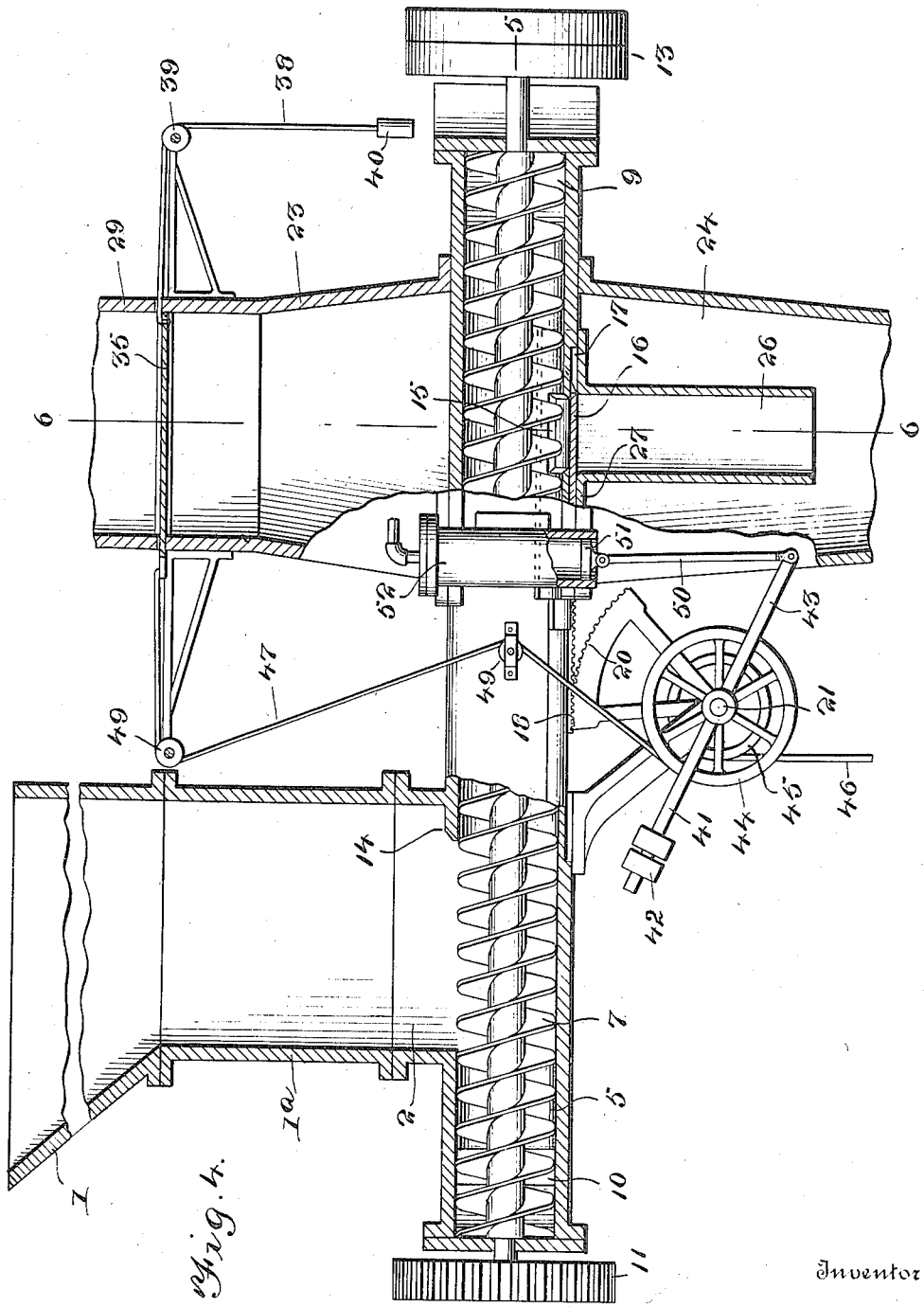

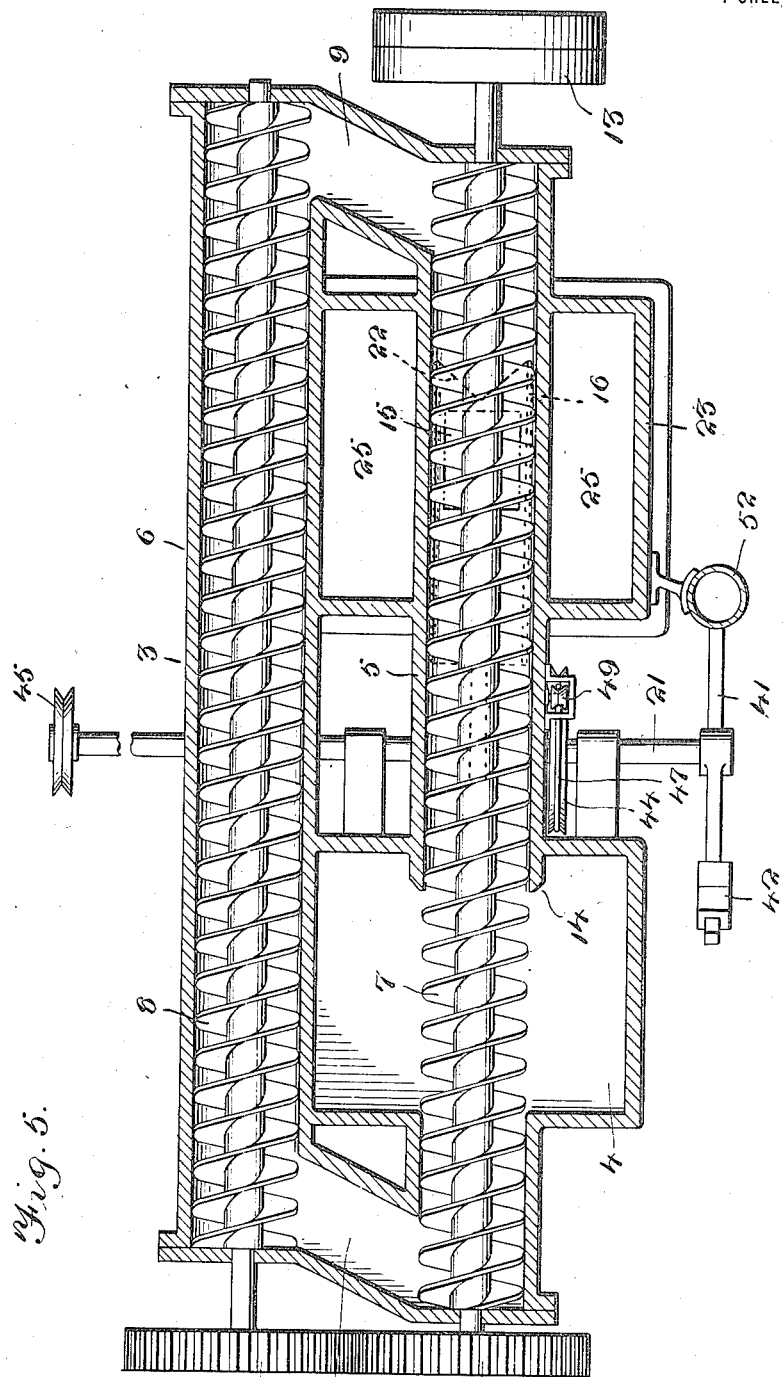

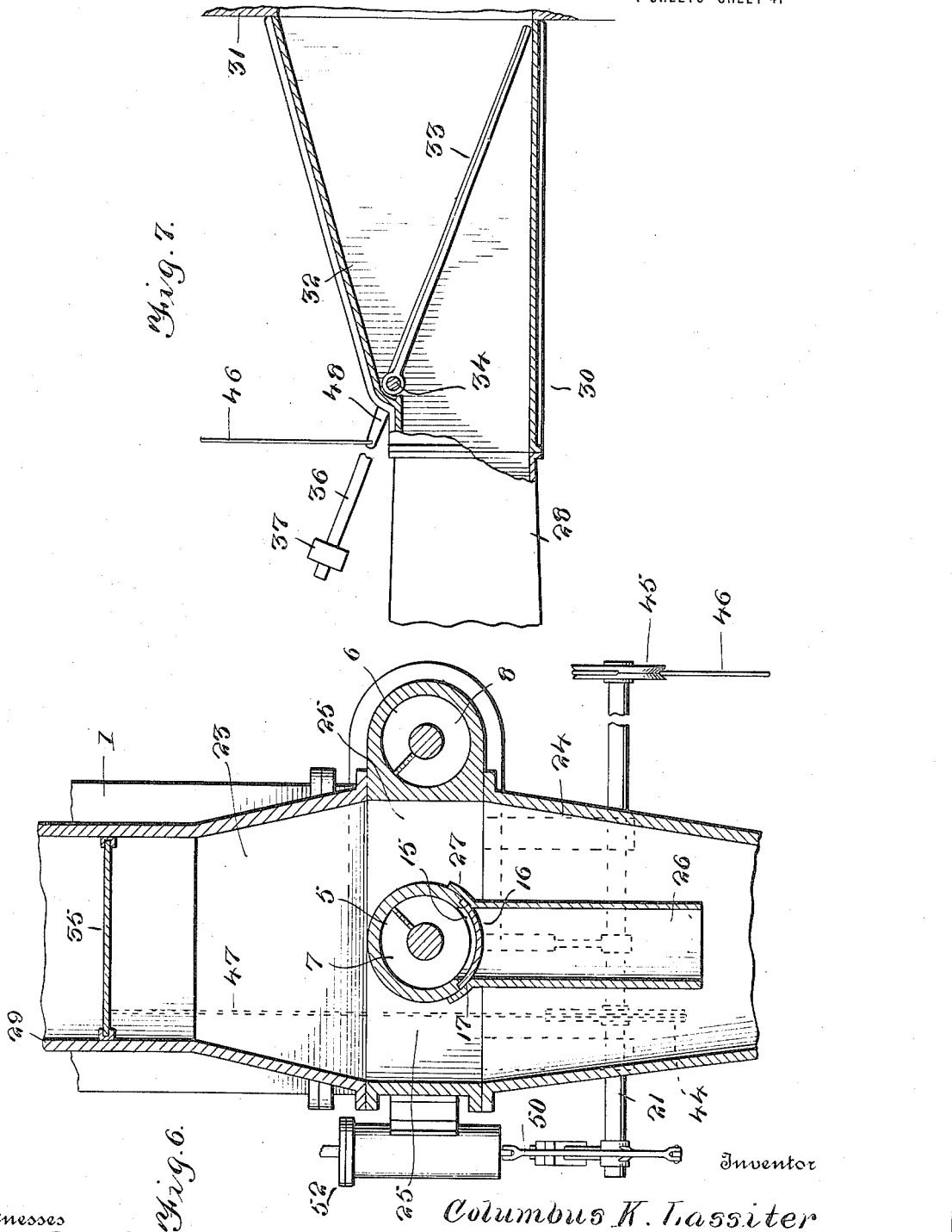

COLUMBUS K. LASSITER, OF RICHMOND, VIRGINIA.

FUEL FEEDER AND CONTROLLER.

1,209,597.  Specification of Letters Patent.  Patented Dec. 19, 1916.

Application filed December 9, 1914. Serial No. 876,320.

*To all whom it may concern:*

Be it known that I, COLUMBUS K. LASSITER, a citizen of the United States, residing at Richmond, in the county of Henrico and State of Virginia, have invented new and useful Improvements in Fuel Feeders and Controllers, of which the following is a specification.

My invention relates to improvements in fuel feed systems of that kind in which a comminuted fuel, such as coal dust, is supplied, properly admixed with air, to a combustion chamber for consumption.

The general object of the invention is to provide a fuel feeding and controlling apparatus which insures regular and uniform feed, a proper mixture of coal dust and air, ease and efficiency of control, compactness and simplicity of construction, economy in the use of fuel, capacity to vary the supply of fuel as desired, and proper proportioning of fuel and air supply and coördination in regulating the blast, fuel feed and velocity of the fuel mixture.

Other and more specific objects and advantages of the invention are hereinafter fully set forth.

In the accompanying drawing, showing one form of means for carrying my invention into practical effect, Figure 1 is a perspective view of my improved fuel feeding and controlling apparatus as adapted for use in conjunction with a steam boiler furnace, the latter being fragmentarily disclosed. Fig. 2 is a sectional perspective view of the feeder and blast and suction chambers. Fig. 3 is a fragmentary bottom perspective view of the discharge portion of the feeder casing, showing the fuel feed valve in open position. Fig. 4 is a vertical longitudinal section through the feeding and mixing portions of the apparatus. Fig. 5 is a sectional plan view on line 5—5 of Fig. 4. Fig. 6 is a vertical transverse section on the line 6—6 of Fig. 4. Fig. 7 is a vertical longitudinal section through the fuel delivery or burner nozzle and showing the velocity regulator valve in closed position.

Referring to the drawings, 1 designates a bin or hopper to which the previously dried and pulverized coal dust is supplied in any suitable manner, and which communicates at its bottom through a conductor $1^a$ with the inlet 2 of a feeder. This feeder comprises a casing 3 formed with a receiving chamber 4 and longitudinal, parallel compartments 5 and 6 in which respectively operate a feed screw 7 and a return screw 8. The compartments 5 and 6 are in communication at their ends through cross passages 9 and 10, so that the excess portion of the coal dust which is not discharged into the feed conduit from the compartment 5 will pass to the compartment 6 through the channel 9 and thence return by the action of the screw 8 and through the channel 10 to the screw 7 for return to the chamber 4, whence it passes again with accretions to the compartment 5 for feed travel to the discharge outlet.

The feeder is designed to be continuously operated and to have a constantly uniform or invariable feeding capacity, which is always of the maximum degree, so that a constantly uniform volume of fuel will be presented at all times at the discharge outlet for supply to the feed conduit, thereby obviating any necessity of controlling the action of the feeder member *per se*, together with the objections incident thereto. These screws are provided at one end with intermeshing gears 11 and 12 whereby they are adapted to be driven in unison, and at its opposite end the screw 7 carries a pulley 13 or other means for receiving driving power from a motor or other suitable source, designed to operate the screws constantly at uniform speeds. The compartment 5 communicates with the chamber 4 at a point between its center and the passage 10 and is formed at its mouth with a cut-off flange or projection 14 extending into said chamber, about which flange the coal may bank to keep the coal at a substantially fixed depth about the mouth of the compartment, and thus insure the constant feed of a full load at all times. As shown, the conductor $1^a$ is interposed between the hopper and feed chamber 4, and this conductor is constantly kept filled with coal, whereby the coal is kept from bridging and feeding irregularly and its practical uniformity of feed secured. The powdered coal is moved by the action of the screw 7 past a discharge outlet 15 formed in the bottom of the compartment 5, which outlet is of a definite size and is controlled by a sliding feed regulating valve 16 movable in a guideway 17, and which is connected at one end with a rack bar 18, the toothed portion of which is exposed through slots 19 in the walls of the guideway and meshes with a gear segment 20 mounted upon a rock shaft 21, the construction being such that the valve may be moved to bring more or less of a feed slot 22 therein into registry with the outlet 15 to permit a greater or less amount of the coal dust to discharge. The intermediate portion of the feed casing extends between and is suitably secured to the proximate portions of a blast chamber 23 and a suction or primary mixing chamber 24, which chambers are in communication through a pair of parallel vertical blast passages 25 which are arranged on opposite sides of that portion of the compartment 5 in which the outlet 15 is formed. Depending from this compartment within the chamber 24 is a suction tube or nozzle 26 which is provided at its upper end with a flange 27 suitably secured in position to support said tube, which forms with the bottom of the compartment 5 a guide passage 17. The tube or nozzle 26 receives the charge of fuel dropping thereinto through the valve slot 22 when the valve is open and delivers such charge into the chamber 24, which is arranged at the upper end of a vertically disposed mixing tube or chamber 27, provided at its lower end with a horizontally extending delivery portion 28, through which the fuel is delivered to the combustion chamber in the manner hereinafter described.

The blast chamber 23 communicates at its upper end with a low pressure air supply or blast pipe or tube 29, supplied with air from a fan or blower or other suitable source, the air being delivered for flow through the feed conduit formed by the elements 29, 23, 24 and 28 at a proper working pressure which is sufficient to supply the right amount of air to commingle with the dust in the tube 27 to form a combustible charge, and to deliver the charge at a uniform velocity into the combustion chamber without blowing the charge at a high pressure and velocity into the combustion chamber with its attendant objections. The columns of air feeding downward through the passages 25 enter the tapering chamber 24 on opposite sides of the tube 26 and meet immediately below the lower delivery end of said tube, thus creating a suction and forming a partial vacuum in said tube, by which the amount of fuel exposed for delivery at the opening 15 will be instantly drawn into the tube, whereby the accurate supply of a definite amount of fuel to the feed conduit, proportionate to the effective size of the slot or port 22, is insured. As this dust so drawn into the chamber 24 comes in contact with cross currents of air agitated by the combination of the two currents of air traveling through the respective passages 25, it is evident that a thorough admixture of the air with the fuel is insured, since the particles of fuel are separated and held in suspension in the air current, and are supplied in that condition to the combustion chamber from the mixing tube or chamber.

In order to secure greater reliability and greater efficiency of control over the fuel mixture supplied to the combustion chamber, I provide at the delivery end of the feed column a fuel and delivery nozzle or burner 30, which extends into the combustion chamber through one of the walls 31 thereof. This nozzle is preferably of rectangular form in cross section and has its upper wall preferably inclined to form a hood 32 above the level of the upper wall of the pipe 28, and so as to provide a flaring passage for the discharge of the fuel mixture and to receive a velocity regulating valve or damper 33. This valve comprises a disk or plate of proper form to snugly fit between the sides of the nozzle and mounted at its outer end upon a transverse rock shaft 34, whereby it is arranged to swing or tilt vertically to different positions. It is evident that by the use of this valve or damper the size of the passage between the fuel feed conduit and entrance to the combustion chamber may be varied and regulated so as to proportionately regulate the velocity of the feeding stream of fuel, enabling the velocity to be kept uniform notwithstanding any variations of working pressure according to the different conditions of service under which the furnace is being operated. I also provide in the blast or air supply pipe 29 a blast regulating gate or valve 35 which is mounted to slide transversely of said pipe. To the rock shaft 34 of the valve 33 is attached an arm 36 carrying an adjustable weight 37 by which said valve is adapted to be automatically opened by gravity, and attached to one end of the gate or valve 35 is a cord or cable 38 depending over a guide pulley 39 and carrying a weight 40 whereby said valve or gate 35 is adapted to be closed by gravity. The shaft 21 carrying the fuel valve controlling gear 20 is journaled upon the underside of the feed casing and carries at one end an arm 41 provided with an adjustable weight 42, whereby said gear 20 is normally adjusted to open the valve 16, and said shaft is also provided with an arm or handle 43 by which the shaft and gear may be operated to adjust said valve to closed position. On the shaft 21 are pulleys 44 and 45 to which are respectively attached cords or cables 46 and 47, the cord 46 being attached to an actuating arm 48 on the shaft 34 and the cord or cable 47 being passed over a guide pulley 49 and connected with the valve 35 so that the said valves may be simultaneously opened to properly regulated degrees against the resistance of their closing weights or permitted to close under the action of such weights, in which operation the valve 16 will also be opened or closed to proper degrees, it being noted that all three valves 16, 33 and 35 are united for simultaneous adjustment. In practice, I may connect the arm 43 with the rod 50 of a piston 51 movable in a cylinder 52 and which may be connected with the steam generating space of a steam boiler, so that the piston will be forced downward to greater or less degrees according to the pressure of the steam, allowing the amount of fuel fed to the combustion chamber to be accurately regulated according to the degree of the boiler pressure. By this means, the supply of fuel may be entirely cut off when the boiler pressure reaches a maximum degree and may be regulated to control the temperature within the combustion chamber to regulate the generation of the steam to a desired working pressure with maximum reliability and efficiency. It will, of course, be understood that any equivalent means for operating the valve adjusting mechanism may be employed in lieu of that shown, or the valve controlling mechanism may be manually operable to regulate the supply of fuel and air and the velocity of flow of the mixture to the combustion chamber, according to the requirements.

It will be apparent from the foregoing description that in the operation of my improved fuel feeding and controlling system the feeder works at the same capacity at all times, and at all times presents the same amount of fuel at the outlet 15 for discharge into the mixing and supply conduit, thus obviating the necessity of employing variable speed motors or other means for driving the feeder which requires adjustment in order to regulate the feed action, thus avoiding the use of driving means which can not be regulated without trouble and labor or with any degree of reliability and efficiency. It will also be seen that by a certain and positive adjustment of the feed valve 16, the size of the fuel feed outlet is regulated to an exact degree according to the amount of fuel required, and that a regulated supply of fuel to the mixing and feed conduit will be furnished, thus avoiding uncertainties and irregularities resulting from the fuel feed action of a blast employed for this purpose. Furthermore, it will be seen that as the fuel presented for discharge is positively drawn by suction into the feed conduit choking of the feeder can not occur, and that as impinging currents of air are encountered by the entering charge, which currents produce a tumbling body or volume of air, a thorough agitation of the fuel particles ensues and the mixture of a proper proportion of air with the coal dust to support the combustion effected, thus obviating the necessity of employing separate mixing and oxygenating currents, although an extra volume of air may be supplied in any suitable manner when deemed desirable. Another and material advantage of my invention is that the supply of fuel and supply of air are proportionately and coördinately governed, and the velocity of the feeding mixture also governed proportionately to the amount of fuel and air, thus insuring efficient calibration or accurate and proportionate regulation of the feed of fuel according to the work to be performed or heat units furnished, the supply of the exact amount of air to form therewith the combustible mixture, and the regulation of the supply and velocity of the mixture according to richness and volume. Thus when the valve is set or adjusted to supply a determined quantity of fuel within any given period of time, the devices which control the admixture of air in proper proportion with the amount of fuel furnished and which control the velocity of feed of the fuel according to its amount and richness will be adjusted at the same time, thus insuring an absolutely efficient coördination of all working elements at different ranges of temperatures to be produced, governed or controlled, a practical impossibility where the working action of the feeder is varied, or where the fuel, air supply and velocity are not all controlled and governed coördinately.

Fuel feed systems employing powdered coal have been heretofore used with the greatest efficiency in rotary cement kilns. As these kilns have a combustion chamber of great length, but a simple type of feed mechanism is necessary, as the range of travel of the fuel is sufficient to secure combustion without the necessity of regulating the mixture and supply of coal and air with any great degree of accuracy. This is due to the fact that the long range of travel of the fuel, which is of a long-flame and slow-burning character, permits of the burning of the fuel to a high degree. In the employment of such a fuel and feeding system in steam boiler and other furnaces and combustion chambers, in which the combustion space and range of travel of the fuel is comparatively short, difficulties are encountered requiring an accurate supply and admixture of the dust and gas in proper proportionate quantities and at a controlled velocity. In some prior fuel supply systems of this type, it has been customary to regulate the feed of the fuel by varying the speed of the feeder through the action of a variable speed motor by which it is driven, but this is objectionable for the reason that it is difficult and practically impossible at times to secure perfect coördination between the feeder and the air supplying means, and to proportionately regulate the velocity. If the amount of air supply is too large the efficiency of the apparatus is decreased, and if the amount of supply is too small incomplete combustion ensues, with a consequent loss of efficiency and the deposit of slag and unconsumed portions of fuel within the furnace.

In some prior systems, a feeder having a constantly uniform action is employed, and a constant supply of fuel dropped, the amounts supplied being governed by a high pressure blast of air flowing at right angles to its path of discharge, but it is practically impossible with this method to secure a uniform supply of fuel or to regulate the air blast to vary the amount of fuel supply with proper accuracy, and it is often found that with this system, which employs feeding and return screws, that a portion of the high pressure air frequently escapes through the hopper by sweepage through the fuel unless a large quantity of fuel is constantly kept in the hopper. In one prior system I am aware of, an attempt has been made to regulate the supply of air and fuel for different working actions by the use of a feeder having a constantly uniform feed action in connection with a dropper valve and a mixing chamber capable of being expanded and contracted in diameter in conformity with the degree of adjustment of the valve to vary the fuel and air feed supply, but this type of device has been found to be irregular and ineffective in action, owing to the construction and mode of air supplying means employed, to the use of obstructions in the feed conduit and to the practice of varying the size of the mixing chamber or conduit itself, which causes choking under many conditions. Moreover, this device does not provide any means for controlling the admission of air to the air conduit, and accordingly proper control of the elements of the combustible mixture in proper proportions can not be obtained. My invention overcomes all of these objections and insures a more perfect and uniform feed of the fuel and air, and other admixture, as well as their supply in variable quantities for different conditions of service, according to the degrees of heat units to be furnished, and by the provision of means for regulating the admission of air as well as the admission of fuel, and also the control of the velocity of the feed, a coördination of action of the various factors governing the combustion of the fuel is effected, whereby practically the complete combustion of the fuel is obtained.

I claim:—

1. In a fuel feeding apparatus for coal dust, the combination with a mixing and delivery conduit, of a feeder for supplying the coal dust thereto, a valve for regulating the amount of fuel delivered by the feeder to the conduit, a valve for regulating the admission of air to the conduit, a valve in the conduit for governing the velocity of the delivered fuel mixture, and means for simultaneously and coördinately adjusting said valves.

2. In a fuel feeding apparatus for coal dust, the combination of a mixing and delivery conduit, a feeder having an outlet in communication with the conduit, a valve controlling said outlet, a valve for controlling the supply of air to the conduit, a valve for regulating the delivery velocity of the mixture, and automatic means for simultaneously and coördinately adjusting said valves.

3. In a fuel feeding apparatus for coal dust, the combination of a mixing and delivery conduit, a valve controlling the supply of air thereto, a feeder having a delivery opening communicating with the conduit, and means coöperating with said opening for drawing the fuel charged by suction into the conduit, a valve controlling said opening, a valve for regulating the delivery velocity of the fuel mixture, and means for simultaneously and coördinately adjusting said valves.

4. In a fuel feeding apparatus for coal dust, the combination with a fuel feeder, of means for discharging predetermined quantities of fuel therefrom, means for supplying air for admixture with the fuel charge, means for governing the delivery velocity of the fuel mixture, and means for simultaneously and coördinately governing the fuel discharge, air supplying and velocity regulating means.

5. In a fuel feeding apparatus for coal dust, the combination with a fuel feed chamber having a discharge outlet, of a combustion chamber, a mixing and delivery conduit between said feed and combustion chambers, said conduit comprising an inextensible vertical mixing portion and a horizontal delivery portion, a feeder operating in the feed chamber for delivering the fuel to the discharge opening thereof, a valve controlling said opening, air supplying means communicating with the mixing chamber and including means for producing a suction action to draw the fuel charges into the conduit, a valve for controlling the inlet of air, a valve in the delivery portion of the conduit for controlling the delivery velocity of the fuel mixture, and means for simultaneously and coördinately adjusting said valves.

6. In a feeding apparatus for coal dust, the combination of a conduit having an air inlet end and a fuel delivery end, an air admission valve at the air delivery end, a velocity controlling valve at the fuel delivery end, a feeder having a constantly uniform feeding action and provided with an outlet communicating with the conduit between said air inlet and velocity controlling valves, said outlet being arranged to form passages for the flow of air, a valve controlling said fuel discharge outlet, and means for simultaneously and coördinately adjusting the several valves to proportionately vary the admission of air and feed of fuel and control the velocity of the fuel mixture.

7. In a feeding apparatus for coal dust, the combination of a feed conduit having an air inlet at one end and a fuel discharge outlet at its opposite end, a valve controlling the admission of air to said conduit, a valve within the discharge portion of the conduit for controlling the velocity of the fuel mixture, a fuel feeder having a constantly uniform feed capacity, said feeder being provided with an outlet projecting into the conduit and provided with a suction discharge nozzle, a fuel feed valve controlling the discharge of the fuel from the outlet to said nozzle, and means for simultaneously and coordinately adjusting the air inlet, fuel velocity and fuel discharge valves.

8. In a feeding apparatus for coal dust, the combination with a delivery conduit, of valve controlled means for feeding coal dust to said conduit, valve controlled means for supplying air to the conduit in rear of the valve controlled fuel supplying means in the direction of travel of the fuel mixture, a velocity regulating valve within the delivery portion of the conduit, and means for adjusting said valves simultaneously and coördinately for proportionately controlling the admission of air, supply of powdered fuel and velocity of the mixture.

9. In a fuel feeding apparatus for coal dust, the combination of a supply conduit, means for feeding the fuel to said conduit, means for supplying a blast of air under low pressure to the conduit in rear of the fuel for admixture with the fuel and travel therewith toward the delivery end of the conduit, and means regulable simultaneously and coördinately for governing the admission of fuel, regulating the supply of air to the conduit in proportion to the amount of fuel supply, and governing the velocity of discharge of the fuel mixture.

10. In a feeding apparatus for coal dust, the combination of a supply conduit, an air inlet valve governing the supply of air to the conduit, a velocity controlling valve at the delivery end of the conduit, a feeder having a constantly uniform feeding action, and provided with an outlet opening into the conduit at a point between said valves, for the supply of the fuel to the interior of the conduit in the path of the flowing air, a valve for controlling the feed of the fuel through said outlet, and means for coöperatively adjusting said valves simultaneously.

11. In an apparatus for feeding pulverized fuel, the combination, with a combustion chamber, of means for feeding thereto a flowing column of a fuel mixture of air and pulverized fuel commingled in constantly fixed relative proportions and traveling at a constantly fixed velocity, and means for varying the volume of the fuel mixture fed to the combustion chamber without varying the relative proportions of the air and fuel constituents of said mixture and also without varying the velocity of said mixture.

12. In a feeding apparatus for coal dust the combination of an air conduit, a feed device having an outlet portion extending across and communicating with said conduit and separating the latter into a plurality of passages, a valve controlling said outlet portion, and a nozzle communicating with said outlet portion and projecting therefrom into the conduit parallel with the axis thereof, said nozzle being arranged to lie in the path of the air flowing through said passages, whereby a partial vacuum will be formed in the conduit to draw the fuel charges into the conduit through the nozzle by suction.

13. In a feeding apparatus for coal dust, the combination of a feed conduit, means for admitting air thereto, means for admitting fuel thereto, means for govering the velocity of the mixture of fuel and air, and means for governing the action of the aforesaid means in unison.

14. In a feeding apparatus for coal dust, a vertically disposed air conduit, a horizontally disposed feeder having an outlet in its bottom communicating with said conduit, and arranged to separate said conduit into a plurality of passages, a suction nozzle communicating with said outlet and depending vertically into the conduit, and means for regulating the effective size of the outlet.

15. In a feed apparatus for coal dust, a vertically disposed mixing chamber having a horizontal delivery portion, an air supply pipe communicating with the upper end of said chamber, a feeder interposed between the chambers and provided with air passages and a discharge outlet, a suction nozzle depending from said outlet into the mixing chamber, a valve in the air supply pipe, a valve controlling said outlet, a valve in the delivery portion of the mixing chamber for controlling the delivery velocity of the fuel mixture, and means for simultaneously and coördinately adjusting said valves.

16. In a feeding apparatus for coal dust, an air supply, mixing and delivery conduit, a feeder having an outlet communicating with said conduit, a valve for controlling said outlet, a valve for controlling the admission of air, a valve for controlling the delivery velocity of the fuel mixture, means for adjusting the fuel feed controlling valve to regulate the supply of the coal dust, and means governed thereby for simultaneously and coördinately adjusting the air admission and velocity regulating valves.

17. In a feeding apparatus for coal dust, the combination with a feeder, for supplying coal dust, of valve controlled means for regulating the discharge of the fuel into the feed line, valve controlled means for supplying air for admixture with the supplied fuel, valve controlled means for regulating the delivery velocity of the mixture, and means for simultaneously and coördinately adjusting the respective valves.

18. In a feeding apparatus for coal dust, the combination with a feeder, of a mixing conduit having a vertically disposed mixing chamber and a horizontally disposed delivery portion, means for regulating the admission of air to the mixing chamber, and means for regulating the feed of coal dust to the mixing chamber, means in the horizontal delivery portion of the mixing chamber for regulating the delivery velocity of the mixture without varying the area of the mixing chamber, and means for adjusting all of the aforesaid means in unison.

19. In a feeding apparatus for coal dust, the combination of a feeder having a constantly uniform feed capacity, an air conduit in communication with the feeder, for the delivery of the fuel to a combustion chamber, and means for simultaneously and coördinately controlling the supply of fuel from the feeder to the conduit, the admission of atmospheric air to the conduit and the velocity of the discharge of the fuel mixture of coal and air from the conduit.

20. In a feeding apparatus for coal dust, the combination of a feed conduit, means for supplying air under low pressure to the conduit, means for supplying powdered fuel to the conduit in a direction parallel with the direction of flow of the air column, and means for coöperatively controlling the air and fuel supply in proper proportions and controlling the velocity of the fuel mixture.

21. In a fuel feeding apparatus for coal dust, the combination of a feed conduit, means for supplying fuel to the conduit, means for supplying air to the conduit to form with the powdered fuel a combustible mixture, and means for producing coöperating variations in the supply of fuel and air supply and coördinately controlling the velocity of the mixture.

22. In a fuel feeding apparatus for coal dust, the combination with a feed conduit having inlet and delivery portions, a fuel feed device arranged at a point between said portions and having a delivery portion extending laterally into the conduit and provided with a discharge outlet for the powdered fuel, a suction nozzle extending from said outlet longitudinally of the conduit in a direction toward the delivery end thereof, a valve for admitting air at the inlet end of the conduit, a valve for controlling the discharge of fuel through said outlet, a velocity controlling valve at the delivery end of the conduit, and means for simultaneously and coördinately adjusting the several valves.

23. In a feeding apparatus for coal dust, the combination of a feed conduit, a valve controlling the supply of air under low pressure to the conduit, a feeder having a constantly uniform feeding capacity and provided with an outlet within the conduit, a discharge nozzle communicating with said outlet and arranged to discharge the fuel in a path parallel with the direction of flow of the current, a valve for controlling the velocity of the mixture, a valve controlling the supply of fuel from said outlet to the nozzle, and means for adjusting the respective valves in unison.

24. In a fuel feeding apparatus for coal dust, the combination of a fuel conduit, means controlling the admission of air to the conduit, a feeder having an outlet communicating with the conduit and operating to supply a constantly uniform amount of fuel to the outlet, means for governing the discharge of the fuel through the outlet by suction in predetermined amounts and in a direction parallel with the path of flow of the air current, a valve for governing the velocity of the fuel mixture and means for controlling the aforesaid controlling and governing means for proportionately regulating the admission of air and fuel and the velocity of discharge of the mixture.

25. In a fuel feeding apparatus for coal dust, the combination with a feed conduit, of a feeder having a substantially uniform feeding capacity, a suction nozzle for discharging the fuel therefrom into the conduit, said nozzle being arranged to project the fuel dust into the conduit parallel with and in the direction of the line of flow of the air current, valves for controlling the admission of air, fuel and velocity of the mixture, and pressure controlled mechanism for governing said valves.

26. In a fuel feeding apparatus for coal dust, the combination of a fuel conduit, a fuel feeder, valve mechanism governing the supply of air and fuel to the conduit and the feed velocity of the mixture, and pressure controlled means governing said valve mechanism.

27. In a fuel feeding apparatus for coal dust, the combination of an air conduit, means for admitting air thereto, means for supplying coal dust thereto to commingle with the air to form a combustible mixture, means for controlling the velocity of the mixture, and means for governing the aforesaid means to proportionately vary the supply of air and fuel and govern the velocity of the mixture accordingly.

In testimony whereof I affix my signature in presence of two witnesses.

COLUMBUS K. LASSITER.

Witnesses:
H. B. HUNT,
C. C. HINES.